No. 660,907.  
B. G. LAMME.  
SINGLE PHASE ALTERNATING CURRENT GENERATOR.  
(Application filed May 24, 1899.)

Patented Oct. 30, 1900.

(No Model.)

WITNESSES:
Ethan D. Dodds
H. C. Tener

INVENTOR
Benjamin G. Lamme
BY
Harley G. Carr
ATTORNEY.

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF PENNSYLVANIA.

SINGLE-PHASE ALTERNATING-CURRENT GENERATOR.

SPECIFICATION forming part of Letters Patent No. 660,907, dated October 30, 1900.

Application filed May 24, 1899. Serial No. 718,060. (No model.)

*To all whom it may concern:*

Be it known that I, BENJAMIN G. LAMME, a citizen of the United States, residing at Pittsburg, in the county of Allegheny and State of Pennsylvania, have invented a new and useful Improvement in Single-Phase Alternating-Current Generators, (Case No. 834,) of which the following is a specification.

My invention relates to single-phase alternating-current generators; and it has for its object to provide a machine of this character which will be comparatively simple in character and inexpensive in construction and effective in operation.

Figure 1:
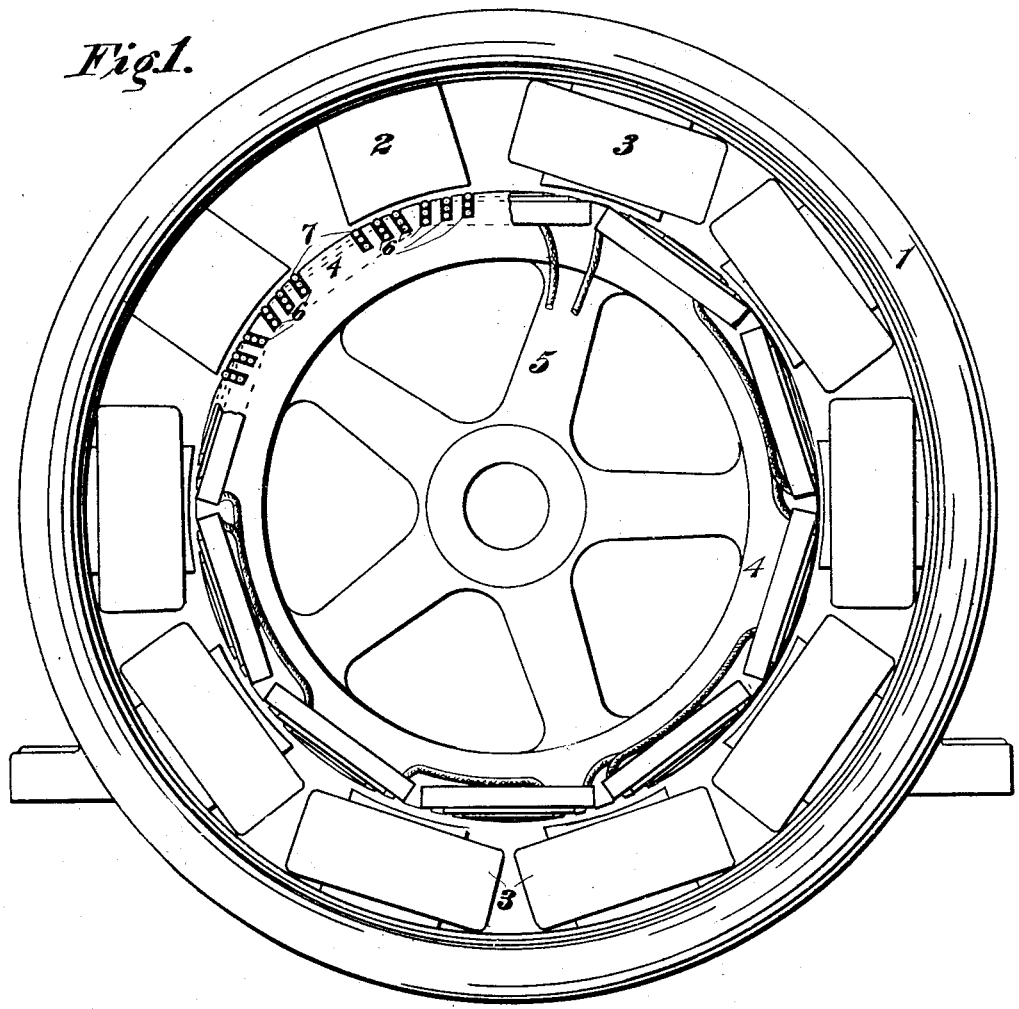
Figure 2:
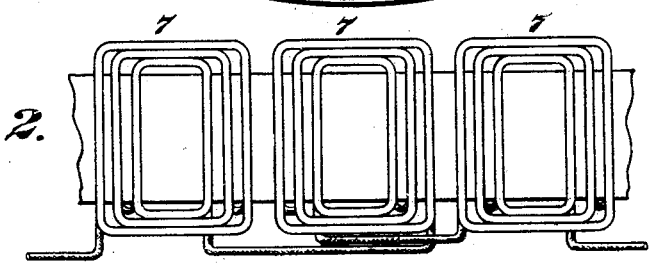
Figure 3:
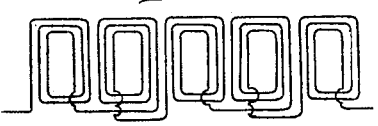

In the accompanying drawings, Figure 1 is an end elevation of a machine constructed in accordance with my invention, certain portions being broken away and omitted. Fig. 2 is a development of a portion of the armature core and windings, and Fig. 3 is a diagram of a portion of a modified form of armature-winding.

Referring now particularly to Figs. 1 and 2, the field-magnet frame 1, pole-pieces 2, and field-magnet coils 3 are or may be of the usual or any well-known construction adapted for generators of the class to which my invention pertains. The armature-core 4 is mounted upon a spider 5 and is provided with a plurality of sets or groups of parallel slots 6, there being one such group for each pole. The slots of each group corresponding to each pole are parallel to each other and to a plane including the armature-axis and the middle point of the segment of the armature-core surrounded by the group of coils 7, located in the slots 6.

In cases where the armature-winding is made up of wire-wound coils, as indicated in Figs. 1 and 2, the coils are separately wound upon suitable molds or forms, there being as many sizes of coils as there are pairs of slots in each group, so that the coils may be readily inserted in the appropriate slots or channels without bending and substantially without the exertion of pressure thereon, the terminals of these several coils of each group being subsequently connected together, so that the entire portion of the winding for each pole constitutes in effect a single coil and the several coils being connected in series around the armature. In cases where a strap-winding is employed each coil for each group corresponding to a pole is bent or coiled into suitable shape for insertion in the slots and suitably insulated, this form being diagrammatically shown in Fig. 3. These coils having the several turns of different lengths may then be inserted in the proper slots or channels and their ends suitably connected to make a single series winding for the entire armature.

The number of slots or channels per pole may obviously be varied in accordance with the size and output of the machine and the spaces between the slots or channels may also be varied from what is shown. I prefer to have a considerable width of core-space included within the inner coil or turn of each group and a comparatively narrow space between the adjacent sides of the outer coils or turns of adjacent groups in order that all of the conductors at the adjacent sides of each two adjacent groups of coils may be under corresponding field-magnet pole-pieces at the same time, thus insuring more satisfactory results than would otherwise be attained.

I claim as my invention—

1. In a dynamo-electric machine, an armature-core provided with a plurality of groups of slots or channels the sides of which in each group are parallel to each other and to a radial plane, in combination with a winding consisting of a plurality of groups of substantially concentric turns located in the core slots or channels.

2. A single-phase alternating-current generator having an armature provided with a plurality of groups of slots or channels, those in each group being parallel to each other and to a radial plane and a single winding comprising a plurality of groups of substantially concentric turns located in said slots or channels.

3. In a dynamo-electric machine, the combination with a field-magnet having radial pole-pieces, of an armature comprising a core having a plurality of groups of slots or channels the sides of which in each group are parallel to each other and to a radial plane and a winding consisting of a plurality of groups of substantially concentric turns located in the core slots or channels, the slots or channels being so disposed that all of the conductors at adjacent sides of each two adjacent groups of coils may be under corresponding field-magnet pole-pieces at the same time.

4. In a dynamo-electric machine, the combination with a field-magnet having radial pole-pieces, of an armature comprising a core having a plurality of groups of slots, the two slots of each group that are nearest to the center being approximately the same distance apart as the space between the adjacent inner edges of adjacent pole-pieces, and a winding consisting of a plurality of groups of substantially concentric turns located in said slots.

5. In a dynamo-electric machine, the combination with a field-magnet having radial pole-pieces, of an armature comprising a core having a plurality of groups of slots, those of each group being disposed in two sets the sides of which are parallel to a radial plane and adjacent sets of adjacent groups being included in a space approximately equal to the width of each pole-piece, and a winding consisting of a plurality of substantially concentric turns located in said slots.

In testimony whereof I have hereunto subscribed my name this 23d day of May, 1899.

BENJAMIN G. LAMME.

Witnesses:
WESLEY G. CARR,
H. C. TENER.